(12) United States Patent
Hwang et al.

(10) Patent No.: US 7,852,243 B2
(45) Date of Patent: Dec. 14, 2010

(54) RECEIVER CIRCUIT

(75) Inventors: Tae-Jin Hwang, Ichon (KR); Kun-Woo Park, Ichon (KR); Yong-Ju Kim, Ichon (KR); Hee-Woong Song, Ichon (KR); Ic-Su Oh, Ichon (KR); Hyung-Soo Kim, Ichon (KR); Hae-Rang Choi, Ichon (KR); Ji-Wang Lee, Ichon (KR); Jae-Min Jang, Ichon (KR)

(73) Assignee: Hynix Semiconductor Inc. (KR)

( * ) Notice: Subject to any disclaimer, the term of this patent is extended or adjusted under 35 U.S.C. 154(b) by 213 days.

(21) Appl. No.: 12/179,486

(22) Filed: Jul. 24, 2008

(65) Prior Publication Data

US 2009/0149142 A1 Jun. 11, 2009

(30) Foreign Application Priority Data

Dec. 11, 2007 (KR) .................. 10-2007-0128299

(51) Int. Cl.
*H03M 1/06* (2006.01)

(52) U.S. Cl. .................. 341/118; 341/119; 341/120; 341/121; 341/143; 341/155

(58) Field of Classification Search ......... 341/118–121, 341/143, 155, 172
See application file for complete search history.

(56) References Cited

U.S. PATENT DOCUMENTS 6,198,313 B1 * 3/2001 Poucher et al. ............... 327/91
6,560,661 B2   5/2003 Toda et al.
6,954,169 B1 * 10/2005 Min ........................... 341/172
6,996,488 B2 *  2/2006 Chu et al. .................... 702/107
7,093,145 B2   8/2006 Werner et al.
7,124,221 B1  10/2006 Zerbe et al.
7,126,408 B2  10/2006 Zerbe
7,265,705 B1 *  9/2007 Lee et al. ..................... 341/162
7,292,629 B2  11/2007 Zerbe et al.
7,400,283 B1 *  7/2008 Zhu ............................ 341/141
7,495,590 B2 *  2/2009 Jeong et al. ................. 341/118
7,683,819 B2 *  3/2010 Kurauchi .................... 341/172
2003/0001762 A1 *  1/2003 Casper et al. ............... 341/118
2003/0214423 A1 * 11/2003 Lee et al. .................... 341/118
2004/0233087 A1 * 11/2004 Blackburn .................. 341/144
2009/0167577 A1 *  7/2009 Juang et al. ................. 341/120
2010/0019943 A1 *  1/2010 Chern ........................ 341/118

FOREIGN PATENT DOCUMENTS

KR     100748462 B1   8/2007

* cited by examiner

*Primary Examiner*—Linh V Nguyen
(74) *Attorney, Agent, or Firm*—Baker & McKenzie LLP (57) ABSTRACT

A receiver circuit is capable of improving its operating characteristics. The receiver circuit includes a variable converter configured to output off-set control voltages in a first output range in a first operation mode and output the off-set control voltages in a second output range in a second operation mode according to a test mode activation signal, and a sense amplifier configured to sense input data based on a sensitivity, wherein the sensitivity is controlled by the off-set control voltages.

11 Claims, 6 Drawing Sheets

RECEIVER CIRCUIT

CROSS-REFERENCES TO RELATED APPLICATION

The present application claims priority under 35 U.S.C. §119(a) to Korean application number 10-2007-0128299, filed on Dec. 11, 2007, which is incorporated herein by reference in its entirety as if set forth in full.

BACKGROUND

1. Technical Field

The embodiments described herein relate to a semiconductor integrated circuit and, more particularly, to a receiver circuit of a semiconductor integrated circuit.

2. Related Art

Generally, an input receiver is employed as an interface circuit in a conventional semiconductor device such as a semiconductor memory. The input receiver plays an important role in signal transmission to receive and buffer an input signal from an external circuit and to transfer the input signal internally. Operational parameters such as the voltage level and set-up/hold time for the input receiver are critical factors to determine high-speed response characteristics of the input receiver and ultimately the device.

Figure 1:
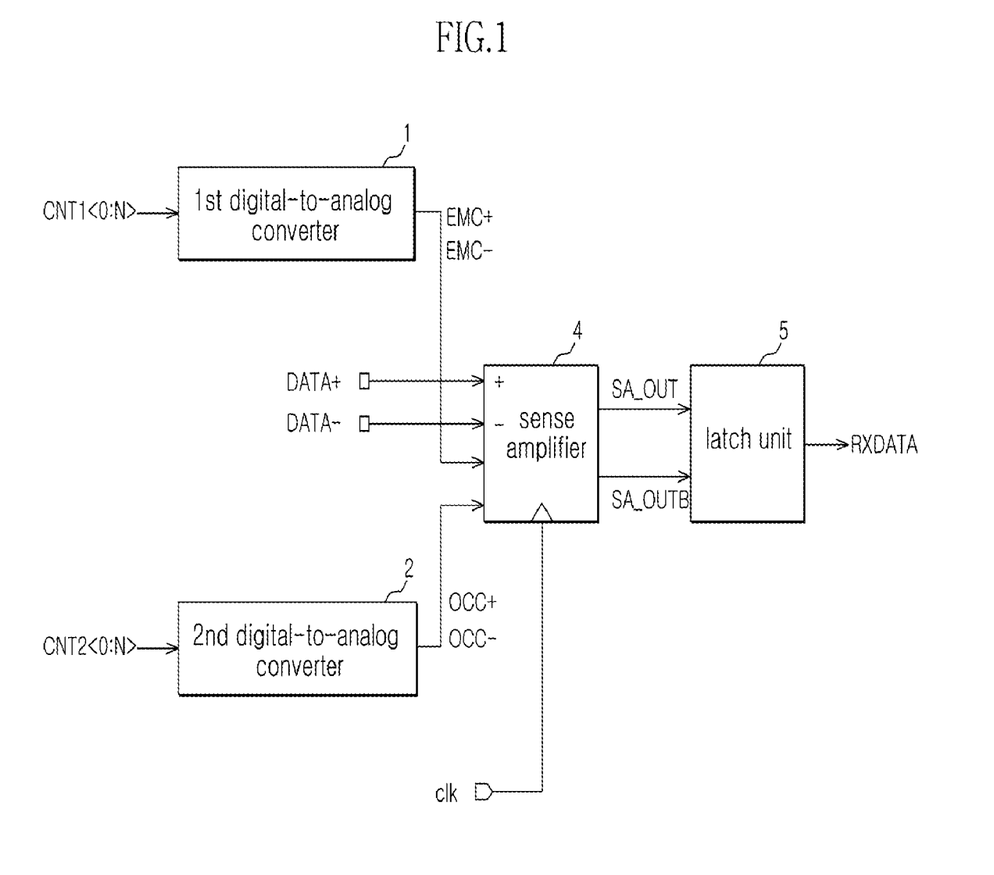
FIG. 1 is a block diagram illustrating a conventional receiver circuit.

FIG. 1 is a block diagram illustrating a conventional receiver circuit. Referring to FIG. 1, the conventional receiver circuit includes a first digital-to-analog converter 1, a second digital-to-analog converter 2, a sense amplifier 4, and a latch unit 5.

The first digital-to-analog converter 1 receives a first control signal 'CNT1<0:N>' and then outputs eye monitoring voltages EMC+ and EMC−. The second digital-to-analog converter 2 outputs off-set control voltages OCC+ and OCC− in response to a second control signal 'CNT2<0:N>'.

The sense amplifier 4 senses and amplifies input data 'DATA+' and 'DATA−' according to a clock signal 'CLK'. The latch unit 5 latches output signals 'SA_OUT' and 'SA_OUTB' of the sense amplifier 4 to output a receiving data signal 'RXDATA'.

The operation of the receiver circuit of FIG. 1 will now be discussed in detail. First, during an eye monitoring test, the first digital-to-analog converter 1 is driven and the eye monitoring voltages EMC+ and EMC− are output. The sense amplifier 4 senses and amplifies the input data 'DATA+' and 'DATA−' according to an off-set voltage that is controlled by the eye monitoring voltages EMC+ and EMC−.

When not in an eye monitoring test mode, the second digital-to-analog converter 2 is driven and the off-set control voltages OCC+ and OCC− are output. The sense amplifier 4 senses and amplifies the input data 'DATA+' and 'DATA−' according to an off-set voltage that is controlled by the off-set control voltages OCC+ and OCC−.

For example, if the eye monitoring voltages EMC+ and EMC− are in a range of a few hundreds of mV, the off-set control voltages OCC+ and OCC− are in a range of a few tens of mV.

The eye monitoring test is used for verifying that data transmitted from a transmission side, the transmitter, are correctly received by a receiving side, the receiver circuit. The accuracy of the data transmission can be verified by monitoring the result of overlay parts of the data outputs, i.e., by monitoring the data eye, through the eye monitoring test. The amount of jitter as well as the data eye can be verified through the eye monitoring test.

Because off-set voltages required in the sense amplifier 4 have different ranges depending on the mode of operation, the first and second digital-to-analog converters 1 and 2 are selectively driven according to the operating modes.

Figure 2:
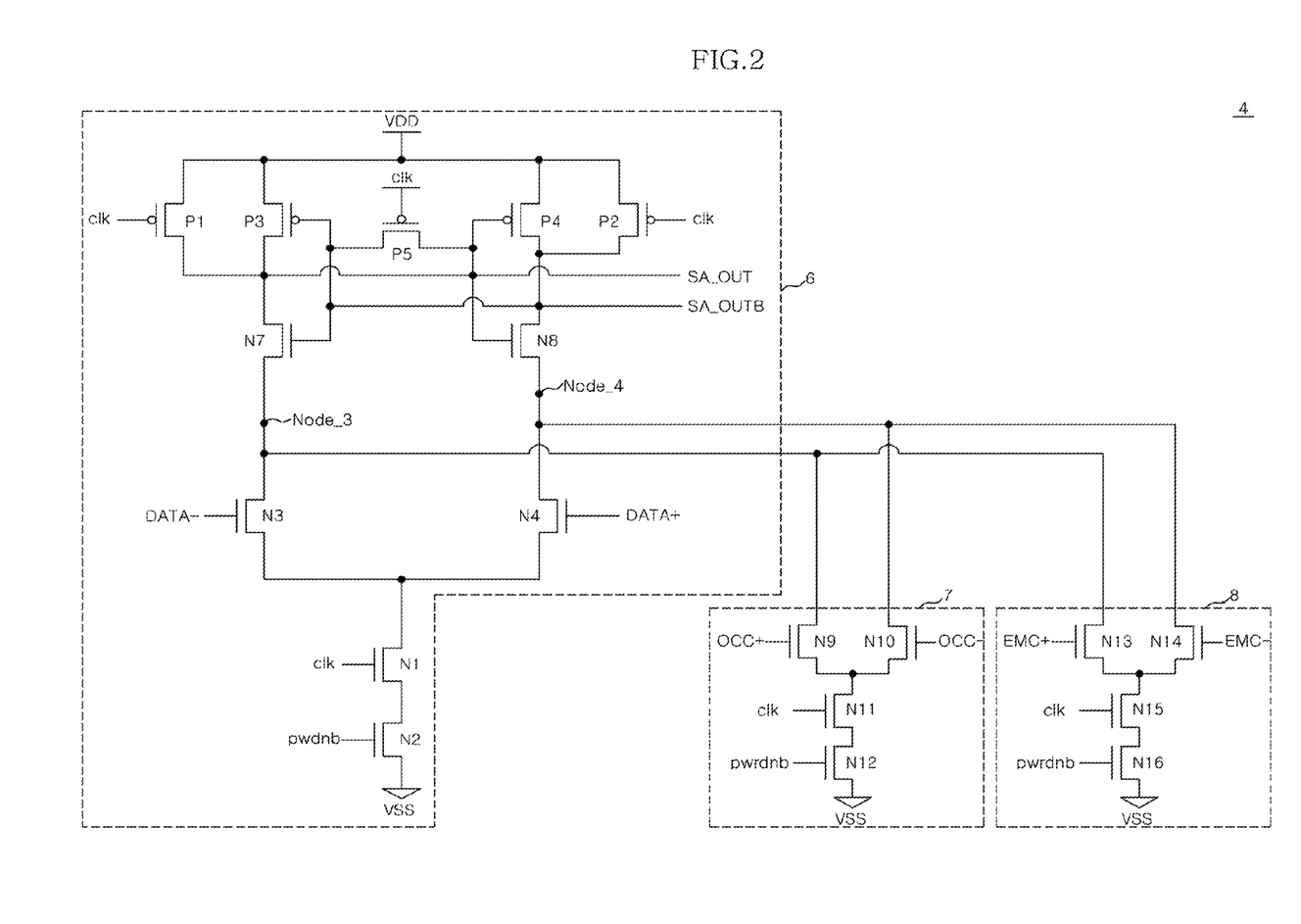
FIG. 2 is a circuit diagram illustrating a sense amplifier included in the conventional receiver circuit of FIG. 1.

FIG. 2 is a circuit diagram illustrating the sense amplifier 4 included in the conventional receiver circuit of FIG. 1. Referring to FIG. 2, the sense amplifier 4 includes an input data amplifier 6, a first off-set voltage adjust unit 8, and a second off-set voltage adjust unit 7. The input data amplifier 6 is made of a cross-coupled latch circuit. The input data amplifier 6 senses and amplifies the input data 'DATA+' and 'DATA−' according to the clock signal 'clk'. The first off-set voltage adjust unit 8 receives the eye monitoring voltages EMC+ and EMC− from the first digital-to-analog converter 1 and then controls the off-set voltage of the input data amplifier 6. The second off-set voltage adjust unit 7 receives the off-set control voltages OCC+ and OCC− from the second digital-to-analog converter 2 and then controls the off-set voltage of the input data amplifier 6.

the sense amplifier 4 can suffer, however, from nonlinear characteristics because of a mismatch (for example, size or area) between an input transistor and the differential drain current and input voltage applied thereto. Accordingly, in order to avoid this problem, the number of transistors is increased in the first off-set voltage adjust unit 8 and the second off-set voltage adjust unit 7 in the sense amplifier, which increases the resource overhead, and as a result, the clock loading is more severe because of increased signal routing due to the additional transistors.

As described above, the conventional receiver circuit uses two or more digital-to-analog converters, such as the first and second digital-to-analog converters 1 and 2, to output the off-set voltages in different ranges. Further, the sense amplifier 4 includes the first off-set voltage adjust unit 8, which receives the output signals of the first digital-to-analog converter 1, and the second off-set voltage adjust unit 7, which receives the output signals of the second digital-to-analog converter 2.

Accordingly, the sense amplifier 4 increases the resources required, and therefore the overhead and circuit area, of the conventional receiver circuit.

SUMMARY

A receiver circuit capable of improving its operating characteristics is described herein.

In one aspect, a receiver circuit comprises a variable converter configured to output off-set control voltages in a first output range in a first operation mode and to output the off-set control voltages in a second output range in a second operation mode according to a test mode activation signal, and a sense amplifier configured to sense input data, wherein the sense amplifier is controlled by the off-set control voltages.

The receiver circuit according to one embodiment can improve the operating characteristics by reducing the overhead of a sense amplifier and stably securing the set-up/hole margin.

These and other features, aspects, and embodiments are described below in the section "Detailed Description."

BRIEF DESCRIPTION OF THE DRAWINGS

Features, aspects, and embodiments are described in conjunction with the attached drawings, in which.

DETAILED DESCRIPTION

Figure 3:
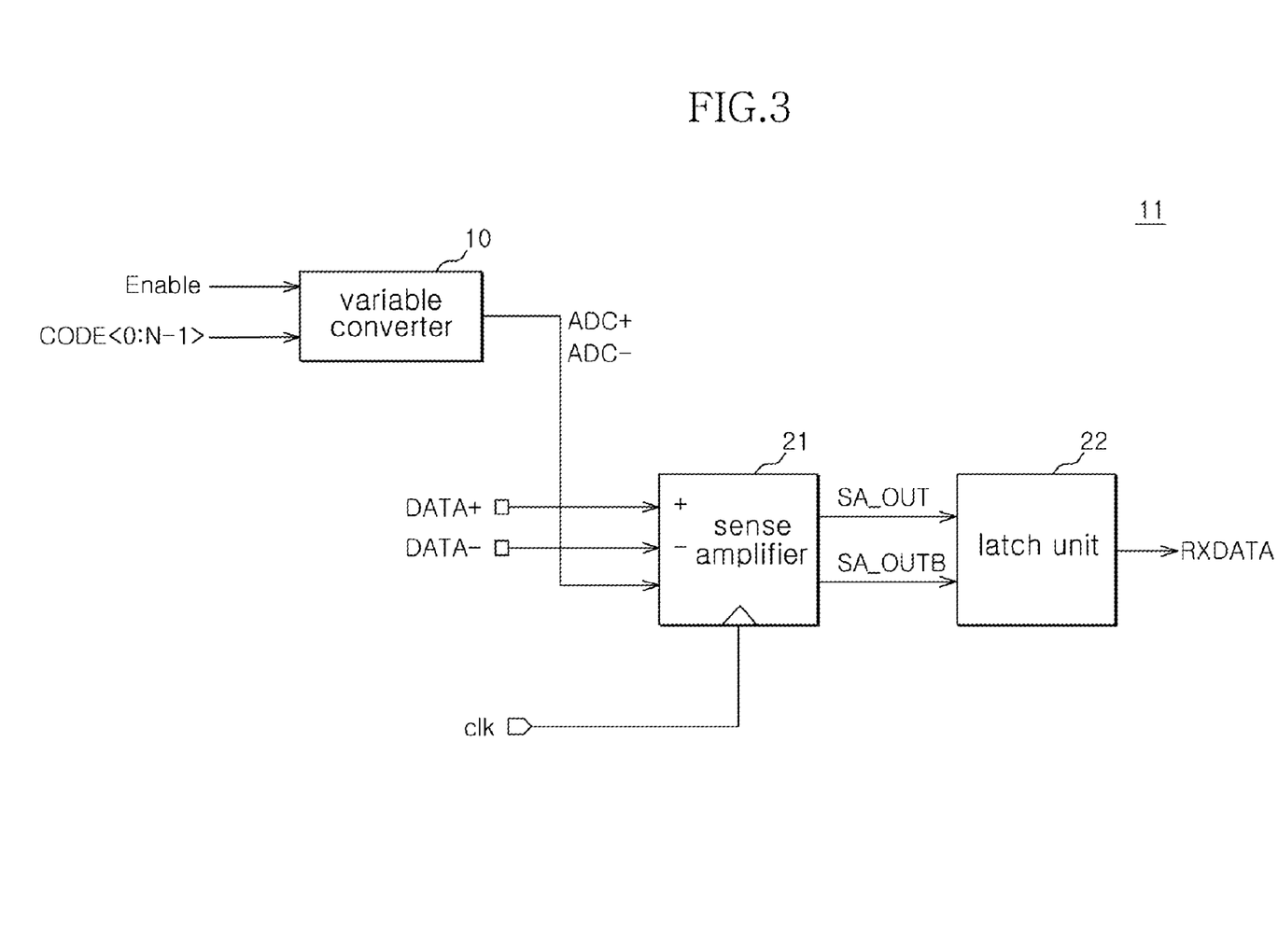
FIG. 3 is a block diagram illustrating a receiver circuit according to one embodiment.

FIG. 3 is a block diagram illustrating a receiver circuit 11 according to one embodiment. Referring to FIG. 3, the receiver circuit 11 can include a variable converter 10, a sense amplifier 21, and a latch unit 22.

The variable converter 10 can be configured to output off-set control voltages ADC+ and ADC− in a first output range associated with a first operation mode according to a test mode activation signal 'Enable'. Also, the variable converter 10 can be configured to output the off-set control voltages ADC+ and ADC− in a second output range associated with a second operation mode according to the test mode activation signal 'Enable'.

The first operation mode can be indicative of an eye monitoring test mode and the second operation mode can be indicative of different operation modes other than the eye monitoring test mode. For example, the second operation mode can be an off-set control mode. If the off-set control voltages ADC+ and ADC− are in a range of a few hundreds of mV at the time of the eye monitoring test mode, the off-set control voltages ADC+ and ADC− can, e.g., be in a range of a few tens of mV at the time of the off-set control operation mode.

As described above, the eye monitoring test can be used for verifying that data transmitted from a transmission side, the transmitter, are correctly received by a receiving side, the receiver circuit 11. The accuracy of the data transmission can be verified by monitoring the result of overlay parts of the data outputs, i.e., by monitoring the size of data eye, through the eye monitoring test.

The variable converter 10 can be configured to output the off-set control voltages ADC+ and ADC− in a relatively wide range at the time of the eye monitoring test and to output the off-set control voltages ADC+ and ADC− in a relatively narrow range at the time of the off-set control operation mode.

Thus, according to one embodiment, circuits for generating the off-set voltages can be simplified in such a manner that the variable converter 10 can be configured to generate the off-set voltages in different ranges according to the first and second operation modes.

The sense amplifier 21 can be configured to sense and amplify input data 'DATA+ and 'DATA−' using off-set voltages controlled by the off-set control voltages ADC+ and ADC−. As compared with the sense amplifier 4 of the conventional receiver circuit, the sense amplifier 21 can be require less overhead, which is an issue in the sense amplifier 4 of the conventional receiver circuit, because the number of input transistors (or steering) can be reduced Typically, the input data 'DATA+' and 'DATA−' are signals that are sent from a transmitter and received through a channel.

The latch unit 22 can be configured to latch and output the output signals of the sense amplifier 21. The latch unit 22 can be implemented as a conventional latch circuit such as is widely used in typical receiver circuits.

Figure 4:
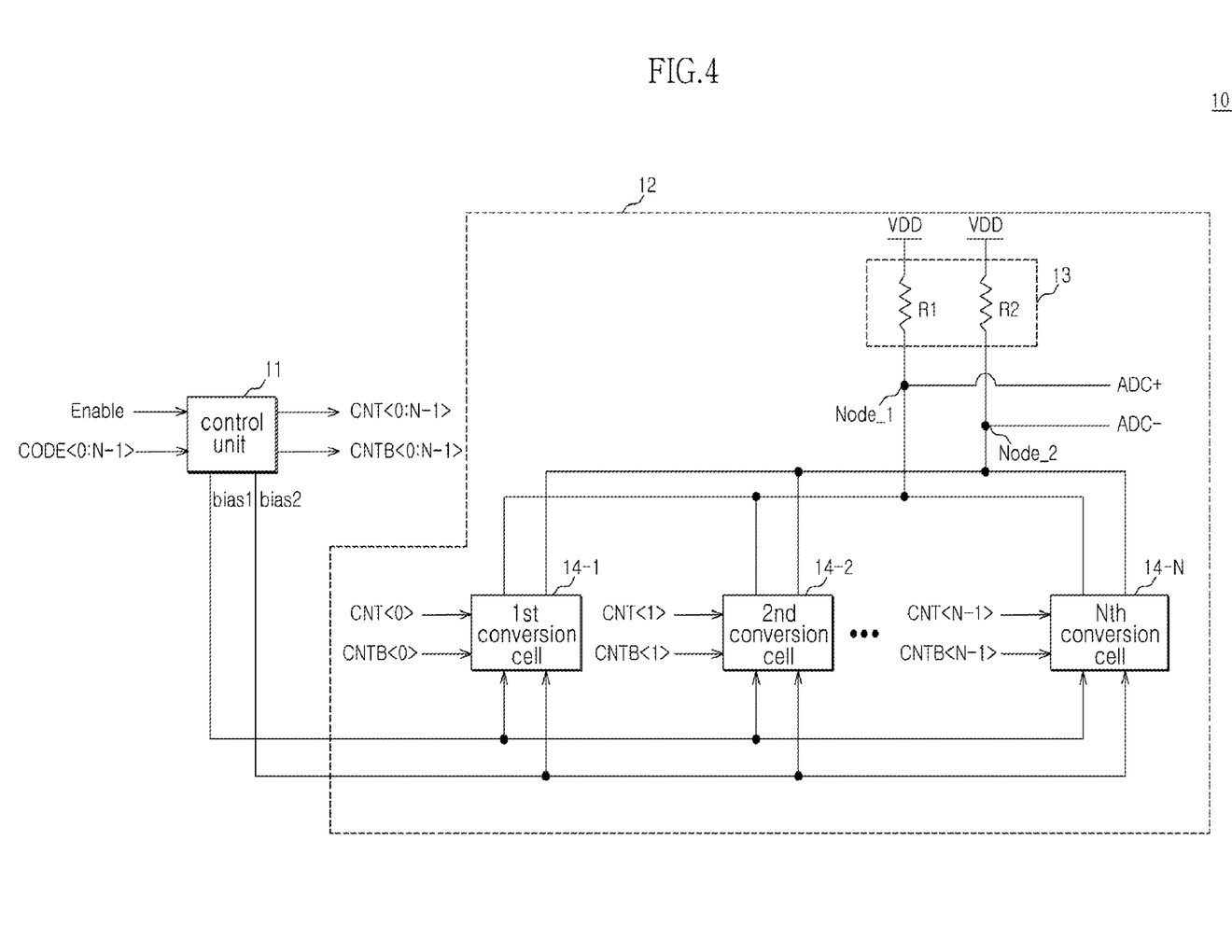
FIG. 4 is a detailed block diagram illustrating a variable converter included in the receiver circuit of FIG. 3 according to one embodiment.

FIG. 4 is a detailed block diagram illustrating the variable converter 10 included in the receiver circuit of FIG. 3 according to one embodiment. Referring to FIG. 4, the variable converter 10 can include a control unit 11 and a conversion unit 12.

The control unit 11 can be enabled in response to the test mode activation signal 'Enable' and can be configured to receive digital codes 'CODE<0:N−1>', thereby outputting first to $N^{th}$ control signals 'CNT<0:N−1>' (N: integer more than 2). That is, when the test mode activation signal 'Enable' is activated, all bits of the control signals 'CNT<0:N−1>' can be activated and, when the test mode activation signal 'Enable' is deactivated, some bits of the control signals 'CNT<0:N−1>' can be activated. For example, when the test mode activation signal 'Enable' is deactivated, the control signals 'CNT<0:M−1>', which correspond to the lower bits of the control signals 'CNT<0:N−1>', can be activated and the control signals 'CNT<M:N−1>', which correspond to the upper bits of the control signals 'CNT<0:N−1>', can be deactivated.

When the test mode activation signal 'Enable' is activated, the control unit 11 can be configured to activate both a first bias voltage (a first voltage control signal 'bias1') and a second bias voltage (a second voltage control signal 'bias2') and, when the test mode activation signal 'Enable' is deactivated, the control unit 11 can be configured to activate only the first voltage control signal 'bias1'.

When the test mode activation signal 'Enable' is activated, current paths formed in the conversion unit 12 can be increased according to the first and second voltage control signals 'bias1' and 'bias2'. Therefore, as compared with the instance where only the first voltage control signal 'bias1' is activated, this instance provides a higher level of the off-set control voltages ADC+ and ADC−.

The conversion unit 12 can be driven in response to the control signals 'CNT<0:N−1>' and then can be configured to produce the off-set control voltages ADC+ and ADC−. In the conversion unit 12, the more the activated bits of the control signals 'CNT<0:N−1>' are increased, the higher the off-set control voltages ADC+ and ADC− can be.

The conversion unit 12 can include first to $N^{th}$ conversion cells 14-1 to 14-N and a resistance unit 13.

The first to $N^{th}$ conversion cells 14-1 to 14-N can be configured to receive the N-bit control signals 'CNT<0:N−1>' based on a bit-by-bit basis and the first to $N^{th}$ conversion cells 14-1 to 14-N can be configured to control the voltage levels of the off-set control voltages ADC+ and ADC− by commonly receiving the first and second voltage control signals 'bias1' and 'bias2'. For example, the first conversion cell 14-1 can be configured to receive the first control signal 'CNT<0>', a first control bar signal 'CNTB<0>', which is complementary to the first control signal 'CNT<0>', and the first and second voltage control signals 'bias1' and 'bias2', and then to control the off-set control voltages ADC+ and ADC−.

The resistance unit 13 can include resistors R1 and R2, which are connected between the first to $N^{th}$ conversion cells 14-1 to 14-N and a power supply voltage VDD, respectively. The off-set control voltages ADC+ and ADC− can be sent from connection nodes Node_1 and Node_2 between the first to $N^{th}$ conversion cells 14-1 to 14-N and the resistors R1 and R2, respectively.

Figure 5:
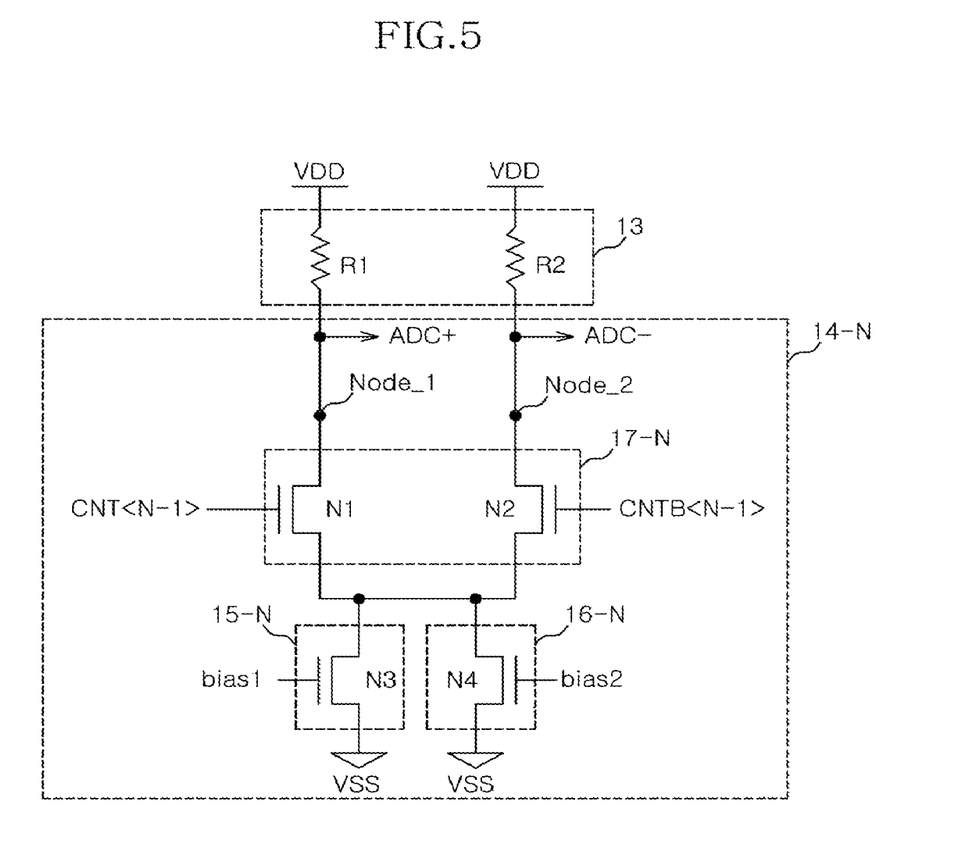
FIG. 5 is a detailed circuit diagram illustrating an $N^{th}$ conversion cell of FIG. 4 according to one embodiment.

FIG. 5 is a detailed circuit diagram illustrating an Nth conversion cell 14-N of FIG. 4 according to one embodiment. Referring to FIG. 5, the $N^{th}$ conversion cell 14-N can include a first current path 15-N, a second current path 16-N, and a control signal input unit 17-N.

The control signal input unit 17-N can include a first NMOS transistor N1 and a second NMOS transistor N2. The first NMOS transistor N1 can have a gate to which the $N^{th}$ control signal 'CNT'<N−1> is applied, a source that is connected to the first and second current paths 15-N and 16-N, and a drain that is connected to the resistance unit 13. The second NMOS transistor N2 can have a gate to which an $N^{th}$ control bar signal 'CNTB'<N−1>, which is complementary to the $N^{th}$ control signal 'CNT'<N−1>, is applied, a source that is connected to the first and second current paths 15-N and 16-N, and a drain that is connected to the resistance unit 13.

The first current path 15-N can be configured to form the current path in the $N^{th}$ conversion cell 14-N in response to the first voltage control signal 'bias1'. The first current path 15-N can be made up of a third NMOS transistor N3 configured to have a gate to which the first voltage control signal 'bias1' can be applied.

The second current path 16-N also can be configured to form the current path in the $N^{th}$ conversion cell 14-N in response to the second voltage control signal 'bias2'. The second current path 16-N can be made up of a fourth NMOS transistor N4 configured to have a gate to which the second voltage control signal 'bias2' can be applied.

Figure 6:
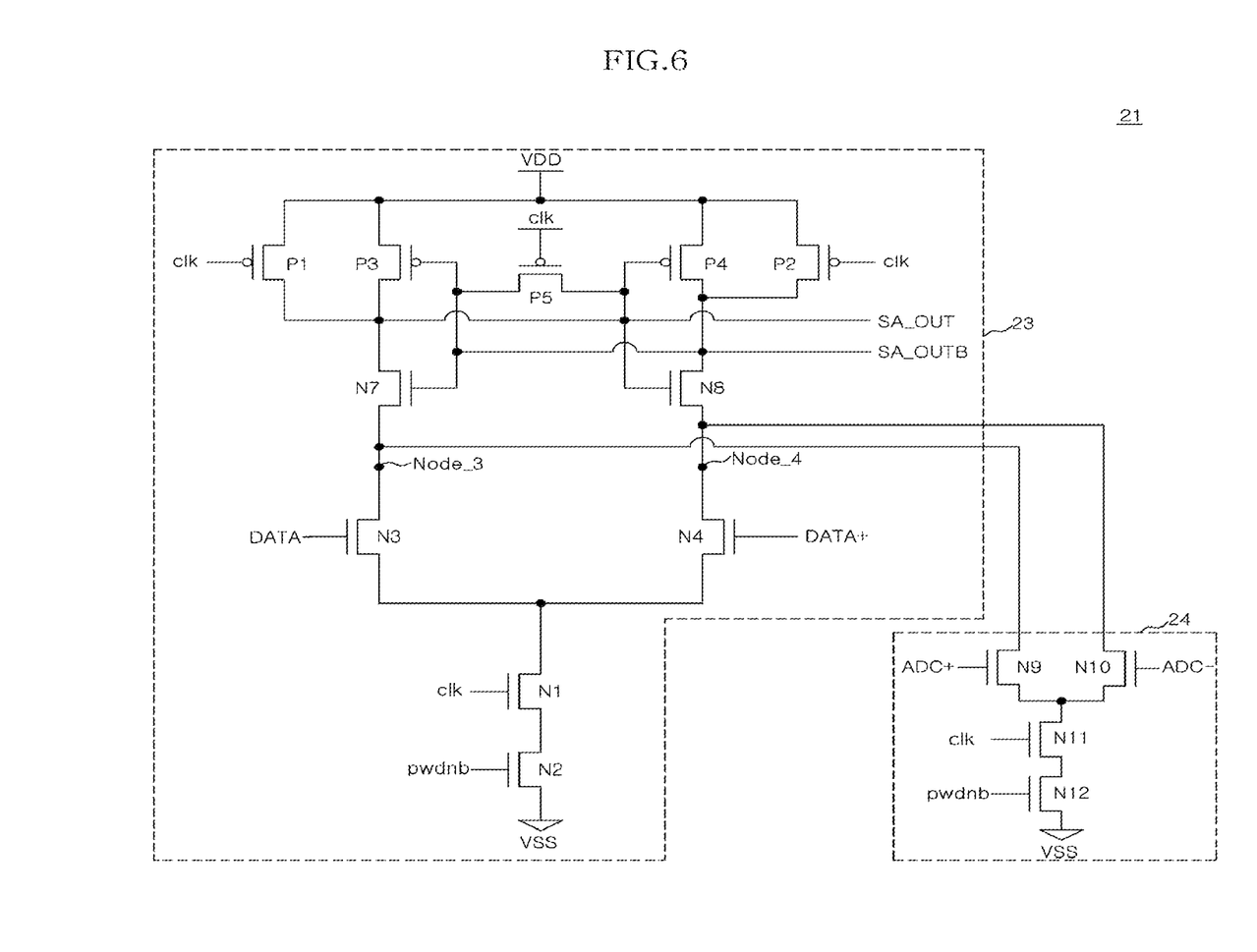
FIG. 6 is a detailed circuit diagram illustrating a sense amplifier included in the receiver circuit of FIG. 3 according to one embodiment.

FIG. 6 is a detailed circuit diagram illustrating a sense amplifier included in the receiver circuit of FIG. 3 according to one embodiment. Referring to FIG. 1, the sense amplifier 21 can include an input data amplifying unit 23 and an off-set voltage adjust unit 24.

The input data amplifying unit 23 can have the same configuration as the input data amplifier 6 of FIG. 6. The off-set voltage adjust unit 24 can be configured to control the off-set voltage of the input data amplifying unit 23 according to the off-set control voltages ADC+ and ADC−.

The operation of the sense amplifier 21 will be described in detail. When clock signal 'clk' is inactivated, the first NMOS transistor N1 can be turned off and the current path can be blocked so that the sense amplifier 21 is not driven. At the same time, the first and second PMOS transistors P1 and P2 and a fifth PMOS transistor P5 can be turned on, thereby precharging the output signals 'SA_OUT' and 'SA_OUTB' to a voltage level of the power supply voltage VDD.

Meanwhile, when a power-up signal 'pwdnb' is activated and the clock signal 'clk' is activated, the first and second PMOS transistors P1 and P2 and the fifth PMOS transistor P5 can be turned off, and the first and second NMOS transistors N1 and N2 can be turned on. Accordingly, the sense amplifier 21 can be configured to execute the amplification of the input data DATA+ and DATA−.

The operation of the receiver circuit according to one embodiment will be described in detail. First, in the case of the eye monitoring test, the test mode activation signal 'Enable' can be activated. Based on the activation of the test mode activation signal 'Enable', all the bits of the first to $N^{th}$ control signals 'CNT'<0:N−1> can be activated and the first and second voltage control signals 'bias1' and 'bias2', which are sent from the control unit 11 in the variable converter 10, can also be activated.

Because all the first and second voltage control signals 'bias1' and 'bias2' are activated, all the current paths of the first to $N^{th}$ conversion cells 14-1 to 14-N, i.e., the first and second current paths 15-N and 16-N, can be open.

All the bits of the first to $N^{th}$ control signals 'CNT'<0:N−1> can be activated, the entire first to $N^{th}$ conversion cells 14-1 to 14-N can be configured to operate.

Because all the first to $N^{th}$ conversion cells 14-1 to 14-N can be configured to operate with the opening of the current paths, the amount of current can be maximized and the off-set control voltages ADC+ and ADC− can be finally sent with a maximum value.

The eye monitoring test can be performed by adjusting the off-set voltage of the sense amplifier 21 to a maximum value, which is over the range in a normal operation, according to the off-set control voltages ADC+ and ADC− sent with the maximum value, and then by adjusting the sensitivity of the sense amplifier 21 with a maximum range.

On the other hand, in the case of the off-set control mode, the test mode activation signal 'Enable' can be inactivated. Accordingly, some bits of the first to $N^{th}$ control signals 'CNT'<0:N−1>, which are sent from the variable converter 10, can be activated and only the first voltage control signal 'bias1' of the first and second voltage control signals 'bias1' and 'bias2' can be activated.

According to the activation of the first voltage control signal 'bias1', only the first current path 15-N can be open in each of the first to $N^{th}$ conversion cell 14-1 to 14-N.

Because some bits of the first to $N^{th}$ control signals 'CNT'<0:N−1> are activated, some of the first to $N^{th}$ conversion cell 14-1 to 14-N can be configured to operate.

Some of the first to $N^{th}$ conversion cell 14-1 to 14-N, in which only one current path is open, can be configured to operate so that the amount of current of the conversion unit 12 in the off-set control mode can be less than that in the eye monitoring test mode and the off-set control voltages ADC+ and ADC− can also be lowered.

According to the off-set control voltages ADC+ and ADC−, which is lowered as compared with that in the eye test monitoring test mode, the off-set control mode can be performed by adjusting the off-set voltage of the sense amplifier 21 to a range in a normal operation and then by adjusting the sensitivity of the sense amplifier 21 based on the range.

The receiver circuit according to one embodiment can be employed in different fields such CPUs and ASICs. Furthermore, various embodiments are available to semiconductor integrated circuits that have three or more operation modes each of which requires a different off-set voltage range, as well as the first and second operation modes.

While certain embodiments have been described above, it will be understood that the embodiments described are by way of example only. Accordingly, the systems and methods described herein should not be limited based on the described embodiments. Rather, the systems and methods described herein should only be limited in light of the claims that follow when taken in conjunction with the above description and accompanying drawings.

What is claimed is:

1. A receiver circuit comprising:
   a variable converter configured to output off-set control voltages which have different voltage levels based on operation modes; and
   a sense amplifier configured to sense input data based on a sensitivity, wherein the sensitivity is adjusted by the off-set control voltages,
   wherein the variable converter includes:
   a control unit configured to output a control signal having a plurality of bits, wherein activation bits of the control signal are different from one another in number according to an activation of a test mode activation signal; and
   a conversion unit configured to vary and output voltage levels of the off-set control voltages according to the control signal, and wherein the control unit is further configured to activate all the bits in the control signal when the test mode activation signal is activated and activate some of the bits in the control signal when the test mode activation signal is deactivated.

2. The receiver circuit of claim 1 wherein the conversion unit is further configured to increase the voltage levels of the off-set control voltages as the number of activation bits is increased in the control signal.

3. The receiver circuit of claim 1 wherein the conversion unit includes:
   a resistance unit connected between a power supply voltage terminal and an output terminal of the off-set control voltages; and
   a plurality of conversion cells commonly connected to the output terminal of the off-set control voltages, wherein each conversion cell is configured to convert the voltage levels of the off-set control voltages in response to one bit of the control signal.

4. The receiver circuit of claim 1, wherein the sense amplifier includes:
   a data amplifying unit configured to sense input data based on a sensitivity corresponding to an off-set voltage; and
   an off-set voltage adjust unit configured to adjust the off-set voltage according to the off-set control voltages.

5. A receiver circuit comprising:
   a control unit configured to output a plurality of bias voltages and a control signal, wherein the plurality of bias voltages are selectively activated according to an activation of a test mode activation signal and activation bits of the control signal are different from one another in number according to an activation of the test mode activation signal;
   a conversion unit configured to vary and output voltage levels of off-set control voltages based on the control signal and the plurality of bias voltages; and
   a sense amplifier configured to sense input data based on a sensitivity, wherein the sensitivity is adjusted by the off-set control voltages.

6. The receiver circuit of claim 5, wherein the control unit is further configured to activate all the bits in the control signal and activate all of the plurality of the bias voltages when the test mode activation signal is activated.

7. The receiver circuit of claim 5, wherein the control unit is further configured to activate a part of the bits in the control signal and activate a part of the plurality of the bias voltages when the test mode activation signal is inactivated.

8. The receiver circuit of claim 5, wherein the conversion unit is further configured to increase the voltage levels of the off-set control voltages as the number of activation bits is increased in the control signal.

9. The receiver circuit of claim 5, wherein the conversion unit is further configured to increase the voltage levels of the off-set control voltages as activated bias voltages of the plurality of the bias voltages is increased in number.

10. The receiver circuit of claim 5, wherein the conversion unit includes:
    a resistance unit connected between a power supply voltage terminal and an output terminal of the off-set control voltages; and
    a plurality of conversion cells commonly connected to the output terminal of the off-set control voltages and configured to commonly receive the plurality of bias voltages, wherein each conversion cell is configured to convert the voltage levels of the off-set control voltages in response to one bit of the control signal.

11. The receiver circuit of claim 5, wherein the sense amplifier includes:
    a data amplifying unit configured to sense input data based on a sensitivity corresponding to an off-set voltage; and
    an off-set voltage adjust unit configured to adjust the off-set voltage according to the off-set control voltages.

* * * * *